(12) United States Patent
Florczak et al.

(10) Patent No.: US 9,751,584 B2
(45) Date of Patent: Sep. 5, 2017

(54) VEHICLE SYSTEM AND METHOD

(71) Applicant: ICE BIKES OF BUFFALO LLC, Depew, NY (US)

(72) Inventors: Lisa Florczak, Lancaster, NY (US); Peter Florczak, Lancaster, NY (US); Charles Roberts, Elma, NY (US)

(73) Assignee: ICE BIKES OF BUFFALO LLC, Depew, NY (US)

( * ) Notice: Subject to any disclaimer, the term of this patent is extended or adjusted under 35 U.S.C. 154(b) by 0 days.

(21) Appl. No.: 14/996,898

(22) Filed: Jan. 15, 2016

(65) Prior Publication Data

US 2016/0207586 A1    Jul. 21, 2016

Related U.S. Application Data

(63) Continuation of application No. 29/524,892, filed on Apr. 24, 2015, now Pat. No. Des. 781,186.

(60) Provisional application No. 61/105,121, filed on Jan. 19, 2015.

(51) Int. Cl.
| | |
|---|---|
| *B62K 17/00* | (2006.01) |
| *B62M 27/00* | (2006.01) |
| *B62M 29/00* | (2006.01) |
| *B62B 19/04* | (2006.01) |
| *B62H 1/14* | (2006.01) |
| *B62K 21/00* | (2006.01) |

(52) U.S. Cl.
CPC .............. *B62K 17/00* (2013.01); *B62B 19/04* (2013.01); *B62H 1/14* (2013.01); *B62K 21/00* (2013.01); *B62M 27/00* (2013.01); *B62M 29/00* (2013.01)

(58) Field of Classification Search
CPC ....... B62K 17/00; B62M 27/00; B62M 29/00; B62M 2027/021; B62M 13/00; B62M 2027/022; A63C 17/18; B62B 13/18; B62B 13/00; B62B 15/005
See application file for complete search history.

(56) References Cited

U.S. PATENT DOCUMENTS

| | | | | |
|---|---|---|---|---|
| 302,044 A | * | 7/1884 | Snyder | .................... B62M 27/00 280/12.14 |
| 351,771 A | * | 11/1886 | Hiler | ...................... A63C 17/18 280/12.14 |
| 483,422 A | | 9/1892 | Class | |

(Continued)

OTHER PUBLICATIONS

Wordpress, Ice Skating, internet page, http://blog.trick-bike.com/2009/01/25/ice-skating-2/, Jan. 25, 2009.

*Primary Examiner* — Brian Swenson
(74) *Attorney, Agent, or Firm* — Hodgson Russ LLP

(57) ABSTRACT

The system can include a vehicle having a vehicle frame and a traction apparatus connected to the vehicle frame for providing traction on a planar surface to move the vehicle relative to the planar surface, the vehicle frame having a seat for supporting a user. The system can also include a support structure including a plurality of runners for contacting the planar surface, the plurality of runners including one or more of the following: skates and skis, and a weight compensation system connecting the vehicle frame to the support structure about a pivot. The weight compensation system is configured to adjust the position of the traction apparatus relative to the support structure in response to weight of a user.

19 Claims, 21 Drawing Sheets

(56) References Cited

U.S. PATENT DOCUMENTS

| | | | | |
|---|---|---|---|---|
| 504,625 A * | 9/1893 | Schmid | ............... | B62M 27/00 |
| | | | | 280/12.14 |
| 508,980 A * | 11/1893 | Roeber | ............... | B62B 13/08 |
| | | | | 280/12.14 |
| 608,622 A * | 8/1898 | Pease | ............... | B62M 27/00 |
| | | | | 280/12.14 |
| 633,030 A * | 9/1899 | Nelson | ............... | B62K 13/00 |
| | | | | 280/12.14 |
| 658,861 A | 10/1900 | Olson | | |
| 800,186 A | 9/1905 | Vaughan | | |
| 1,303,637 A * | 5/1919 | Cowan | ............... | B62M 27/00 |
| | | | | 280/12.14 |
| 1,379,488 A * | 5/1921 | Szywka | ............... | B62M 27/00 |
| | | | | 280/12.12 |
| 3,833,233 A * | 9/1974 | Sugiyama | ............. | B62M 29/00 |
| | | | | 280/12.14 |
| 3,884,484 A * | 5/1975 | Uhlyarik | ............... | B62K 13/00 |
| | | | | 280/415.1 |
| 4,828,280 A | 5/1989 | Kies | | |
| 7,708,096 B2 * | 5/2010 | Vezina | ............... | B62J 25/00 |
| | | | | 180/190 |
| 8,857,822 B1 * | 10/2014 | Schultz | ............... | B62B 13/18 |
| | | | | 280/10 |
| 2004/0145130 A1 * | 7/2004 | Verda | ............... | B62M 27/00 |
| | | | | 280/12.1 |

* cited by examiner

VEHICLE SYSTEM AND METHOD

FIELD OF THE DISCLOSURE

The present disclosure relates generally to vehicles, and in particular to bicycles which are equipped to travel upon snow or ice.

BACKGROUND OF INVENTION

Ice skating is an activity that may be enjoyed by individuals of all ages. However, this activity requires a certain amount of practice and skill to partake in. Further, an individual's available practice time is often limited to the cold winter months for proper ice conditions. This makes it difficult for an individual to master the skill of ice skating. Ice skating can be unsafe as it requires balance and coordination to prevent falling down, which may prevent certain individuals from partaking in the activity (e.g. elderly) due to the risk of injury.

It is an object of the present invention to provide a vehicle for travel upon snow or ice that is easy to use and safe for individuals of all ages.

SUMMARY OF THE DISCLOSURE

According a first embodiment, a vehicle system can include a vehicle having a vehicle frame and a traction apparatus connected to the vehicle frame for providing traction on a planar surface to move the vehicle relative to the planar surface, the vehicle frame having a seat for supporting a user. The system can also include a support structure including a plurality of runners for contacting the planar surface, the plurality of runners including one or more of the following: skates and skis, and a weight compensation system connecting the vehicle frame to the support structure about a pivot. The weight compensation system is configured to adjust the position of the traction apparatus relative to the support structure in response to weight of a user.

The application may also be embodied as systems or methods for compensating for a user's weight on a vehicle—including vehicles that are equipped to travel on surfaces having a relatively low coefficient of friction, such as ice or snow. The method can include providing a vehicle including a vehicle frame for supporting a user and a traction apparatus. The traction apparatus can be connected to the vehicle frame for providing traction on a planar surface to move the vehicle relative to the planar surface. A support structure can also be provided, which may include a plurality of runners in contact with the planar surface, the plurality of runners including one or more of the following: skates and skis. The support structure may include a perimeter frame surrounding the vehicle. A weight compensation system may also be provided that connects the vehicle frame to the support structure about a pivot. The traction apparatus may be moved relative to the support structure in response to the weight of the user such that the vehicle frame rotates about the pivot.

In another embodiment, the present application describes a vehicle system. The system can include a bicycle having a bicycle frame and a wheel connected to the bicycle frame for providing traction on an ice surface to move the bicycle relative to the ice surface. The bicycle frame can have a seat for supporting a user. The system may also include a support structure including a plurality of skates for contacting the ice surface, and a weight compensation system connecting the bicycle frame to the support structure about a pivot. The weight compensation system may be configured to adjust the position of the traction apparatus relative to the support structure in response to weight of a user. The vehicle frame may be rotatable relative to the support structure about the pivot to adjust the position of the traction apparatus relative to the support structure in response to the relative weight of the user. The weight compensation system can also include a slideable frame having an inner frame and an outer frame, the inner frame being translatable relative to the outer frame. The inner frame may be attached to the wheel and the outer frame being fixed relative to the support structure.

BRIEF DESCRIPTION OF THE DRAWINGS

For a fuller understanding of the nature of the objects of the invention, reference should be made to the accompanying drawings and the subsequent description. Briefly, the drawings are.

DETAILED DESCRIPTION OF THE DISCLOSURE

Figure 1:
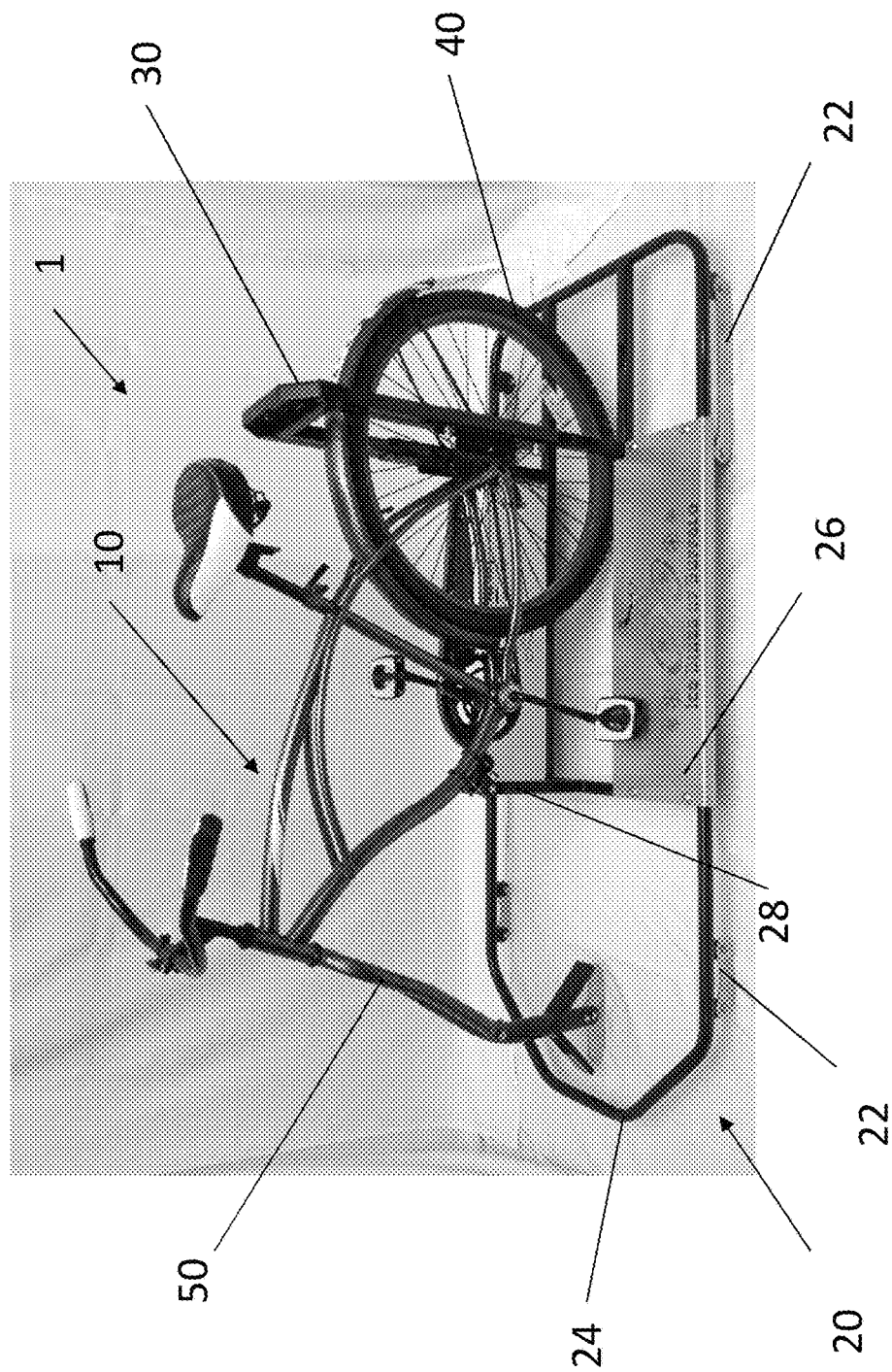
FIG. 1 is a perspective view of a vehicle according to an embodiment of the present invention.

FIGS. 1-21 illustrate an exemplary system 1 according to an embodiment of the present application. As shown in FIG. 1, the system can generally include a vehicle frame 10, a support structure 20, a weight compensation system 30, a traction apparatus 40, and a steering apparatus 50.

Figure 2:
FIG. 2 is another perspective view of a vehicle according to an embodiment of the present invention.
Figure 3:
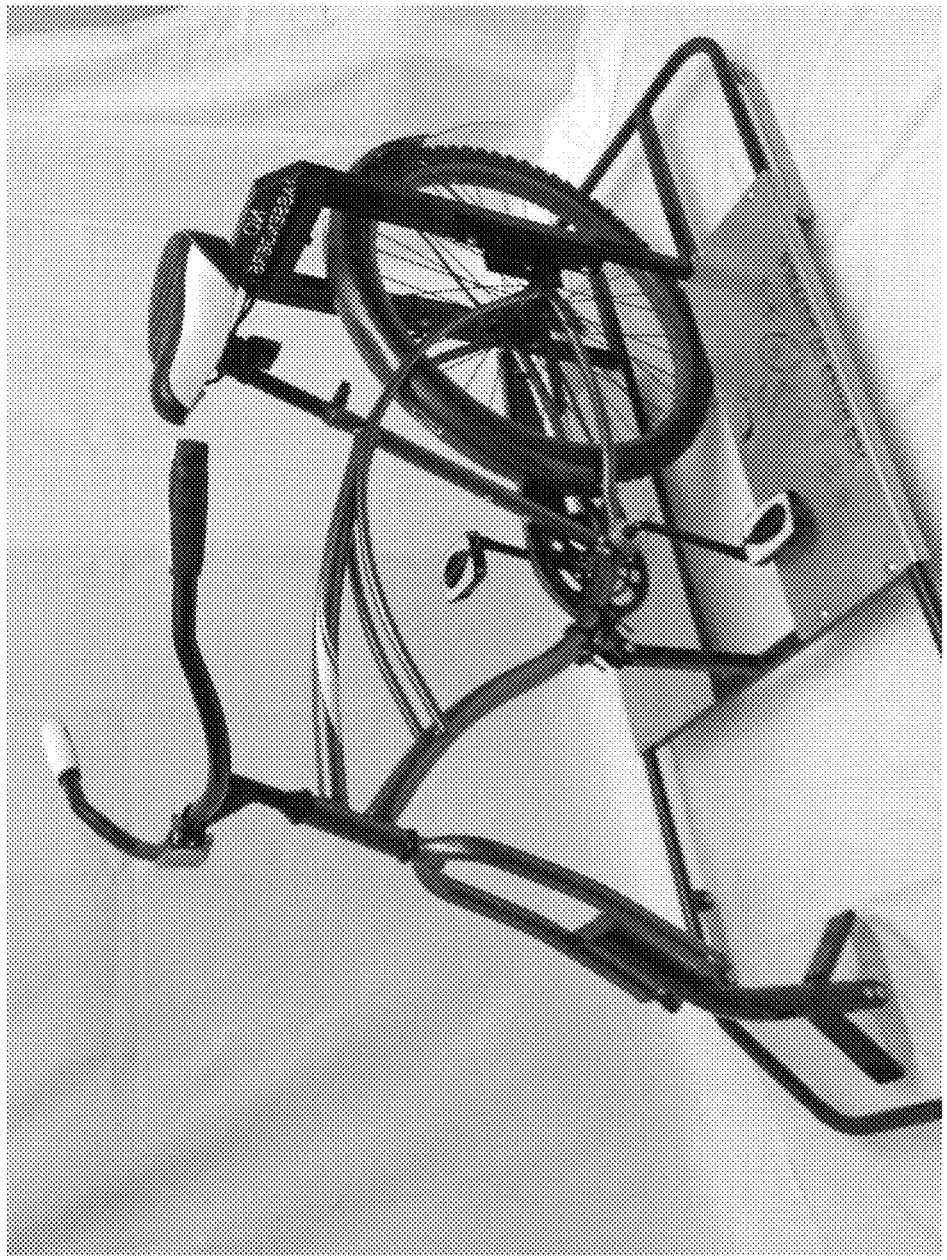
FIG. 3 is yet another perspective view of a vehicle according to an embodiment of the present invention.
Figure 4:
FIG. 4 is a side view of a vehicle according to an embodiment of the present invention detailing the interaction of the support structure, weight compensation system, and traction apparatus.
Figure 5:
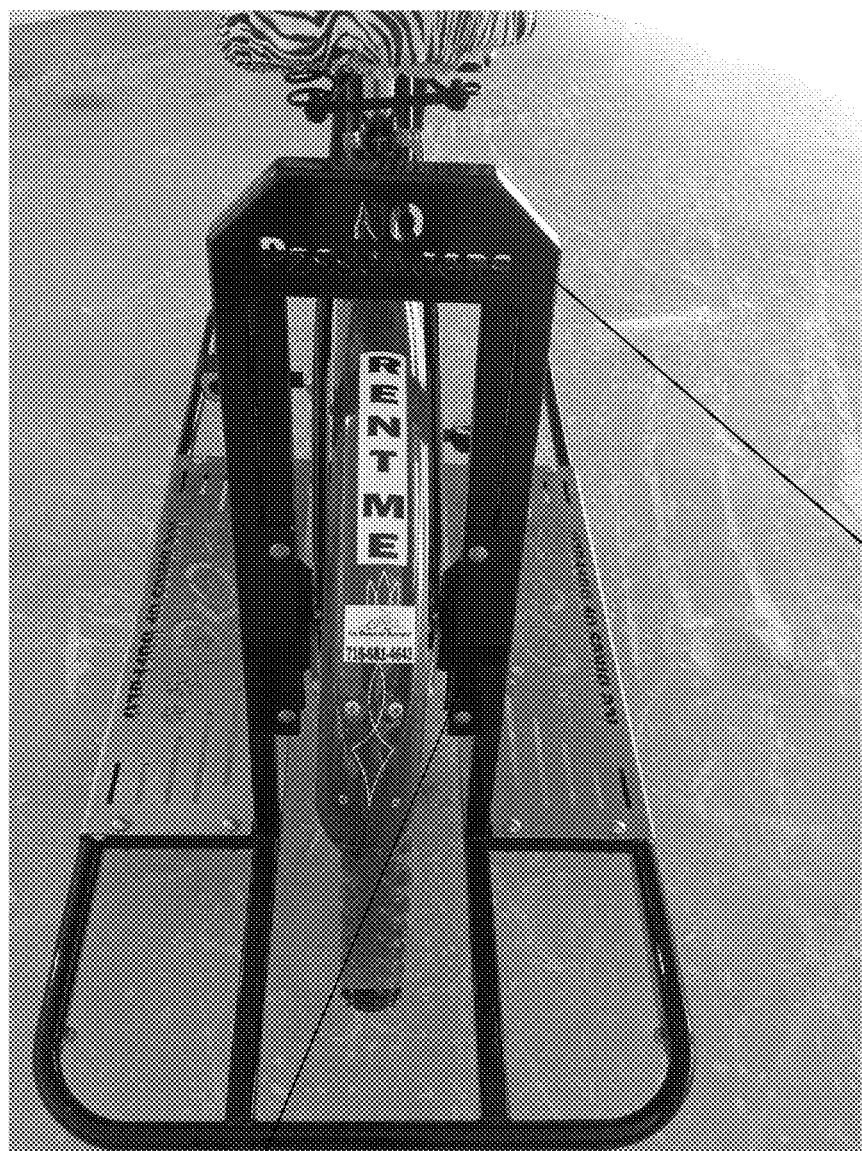
FIG. 5 is a rear view of a vehicle according to an embodiment of the present invention.

With reference to FIGS. 1-3, the support structure 20 can be used to attach the vehicle frame 10 to one or more runners 22. The runners 22 may be laterally offset relative to the longitudinal direction of the frame 10 to provide lateral stability to an operator of the system in use. This can be advantageous for operating the system on low-frictional surfaces such as ice or snow. The runners 22 can also help maintain a particular bearing on such surfaces. The runners 22 may be embodied as skates, skis, wheels, or the like.

The support structure 20 may be defined by a perimeter frame 24. The perimeter frame 24 can partially or completely surround the vehicle (e.g. a bicycle). In the depicted example, the perimeter frame 24 can define an unbroken perimeter about the vehicle frame 10 (e.g. a bicycle frame). Such a perimeter frame 24 can serve to protect the system or user from obstacles incurred during use. The perimeter frame 24 may also be advantageous in protecting others from the system, which may include sharp blades or other, potentially dangerous or hazardous, features. The perimeter frame 24 can be potentially equipped with additional safety features, such as padding about the perimeter of the perimeter frame 24. The support structure 20 can include a step 26 for allowing a user to mount and dismount from a seat of the system. The step 26 may include apertures to provide a high-friction surface, and to also to deter the buildup of ice, snow, or the like.

The weight compensation system 30 may be configured to compensate for a user's weight on the vehicle frame 10 during use of the system 1. For example, the weight compensation system 30 can be configured to allow users of varying weights gain consistent traction on a surface having a low coefficient of friction. Specifically, the weight compensation system 30 can be useful in assisting relatively lighter users to obtain traction via the traction apparatus 40 (e.g. a tread, tire, studded tire, etc.) on a surface having a low coefficient of friction. The weight compensation system 30 may also assist in decreasing the amount of weight placed on the traction apparatus 40 by a user that is relatively heavy.

Figure 6:
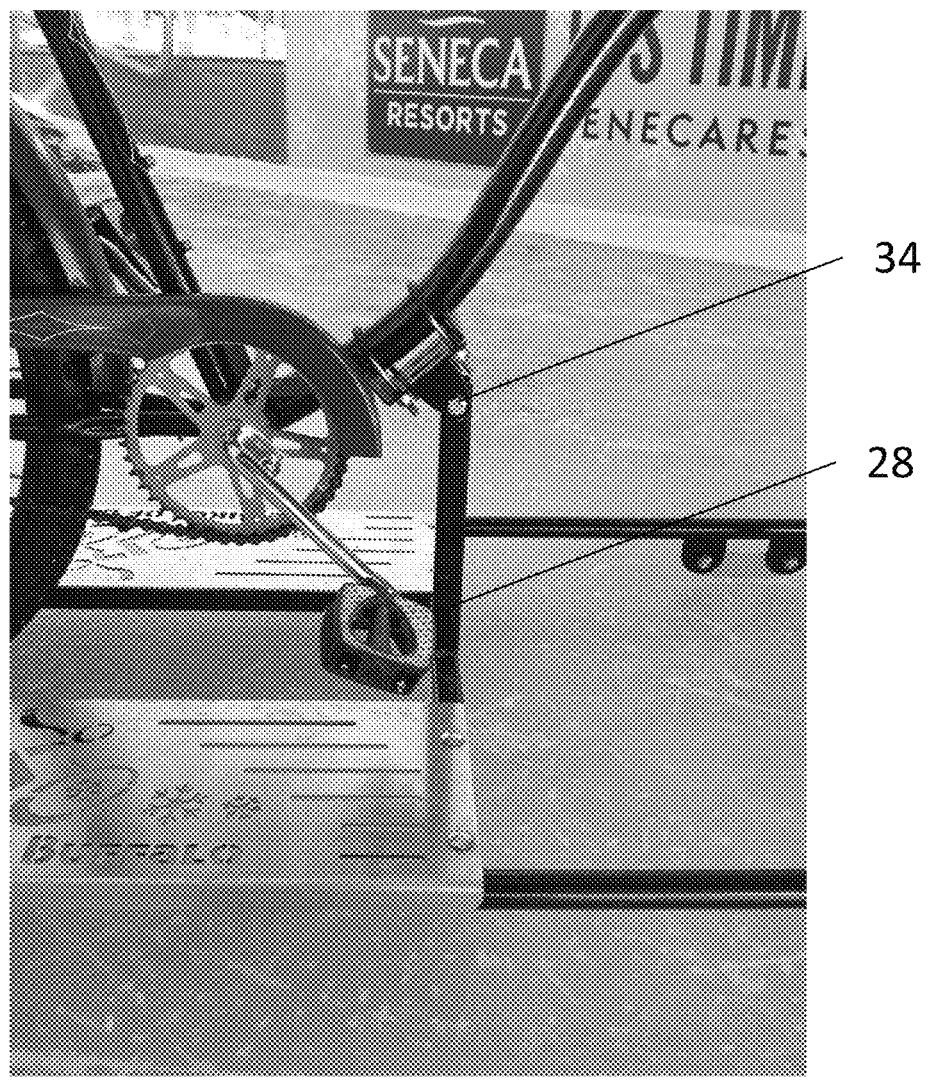
FIG. 6 is a side view of a vehicle according to an embodiment of the present invention, detailing the interaction of the support structure, vertical support, pivot, and vehicle frame.

With reference to FIGS. 4-8, the weight compensation system 30 can be embodied as a pivotable arrangement, including a slidable frame 32 (FIG. 4) and a pivot 34 (FIG. 6). The slidable frame 32 can include an outer frame 32a that is connected to the support structure 20 and an inner frame 32b that is connected to the traction apparatus 40. The inner frame 32b and outer frame 32a may be translatable relative to one another. In one particular example, the inner frame 32b may slide along a track formed by the outer frame 32a. In this manner, the inner frame 32b can slide along longitudinally relative to the outer frame 32a. The outer frame 32a and the inner frame 32b may slide between a rest position and a maximum position. For example, in the rest position, the inner frame 32b can be slid a minimum distance relative to outer frame 32a, for example, when no load is applied to the vehicle frame 10. In the maximum position, the inner frame 32b may be slid a maximum distance away from the outer frame 32a, for instance, when a relatively heavy, or maximum load, is applied to the outer frame 32a. Stops can be provided on the outer frame 32a to prevent the inner frame 32b from sliding beyond the rest position or the maximum position. As the frames 32a, 32b slide relative to one another, the vehicle frame 10 will pivot about the pivot 34. In this manner, the user's weight on the traction apparatus 40 will cause the frames 32a, 32b to slide relative one another to compensate for heavier or lighter users of the device.

The weight compensation system 30 can be configured to direct the user's weight to the traction apparatus 40, rather than both the support structure 20 and the vehicle frame 10. In this manner, the user's weight can be applied to the traction apparatus 40 to gain traction on a low-friction surface—which can be particularly useful for users of relatively low-weight. Because a user having relatively high-weight may gain too much traction, the weight compensation system 30 may reduce the amount of weight applied to the traction apparatus 40. For example, the maximum position of the outer frame 32a and the inner frame 32b may be selected such that the load of a relatively high-weight individual may be directed toward the support structure 20, rather than the traction apparatus 40. The weight compensation system can also include various biasing mechanisms that are configured to compensate for users having various weights. For example, a spring bias may be used to urge the inner frame 32b away from the maximum position in order to further reduce the amount of the user's weight that is applied to the traction apparatus. Similarly, a spring bias may be used to urge the inner frame 32a toward the maximum position in order to increase the force applied to traction apparatus 40.

Figure 7:
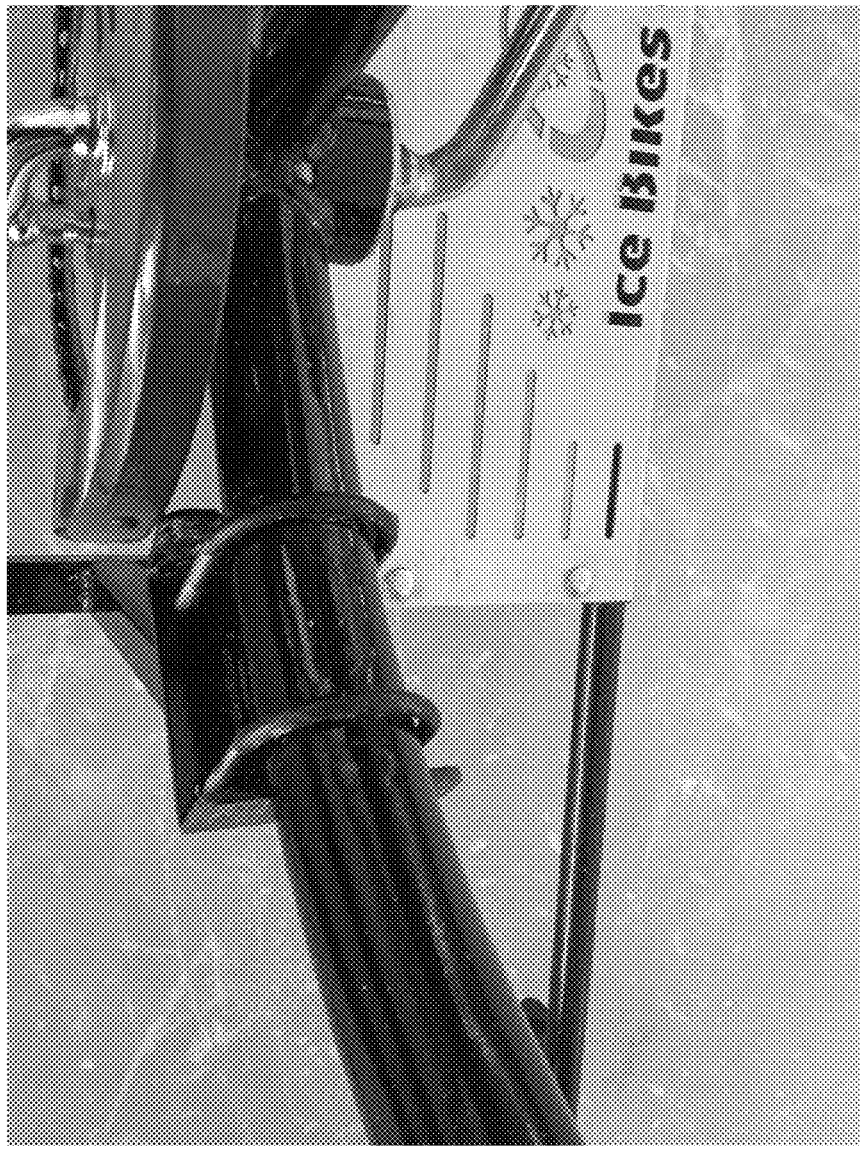
FIG. 7 is a top view of a vehicle according to an embodiment of the present invention, detailing the interaction of the pivot and vehicle frame.
Figure 8:
FIG. 8 is a side view of a vehicle according to an embodiment of the present invention, detailing the interaction of the pivot and vehicle frame.
Figure 9:
FIG. 9 is a perspective view of a vehicle according to an embodiment of the present invention, detailing the steering apparatus.
Figure 10:
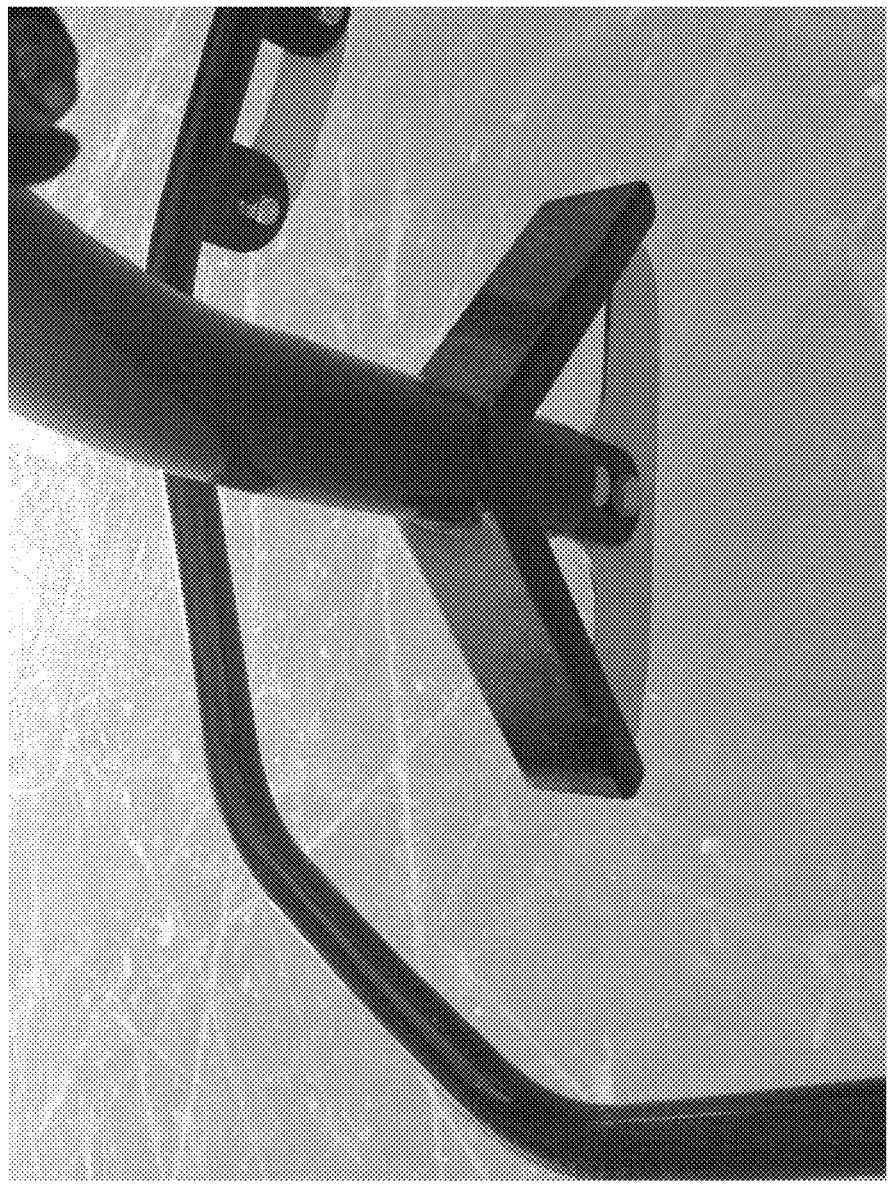
FIG. 10 is another perspective view of a vehicle according to an embodiment of the present invention, detailing the steering apparatus.
Figure 11:
FIG. 11 is a perspective view of a vehicle according to an embodiment of the present invention, detailing the interaction of the steering apparatus and the vehicle frame.
Figure 12:
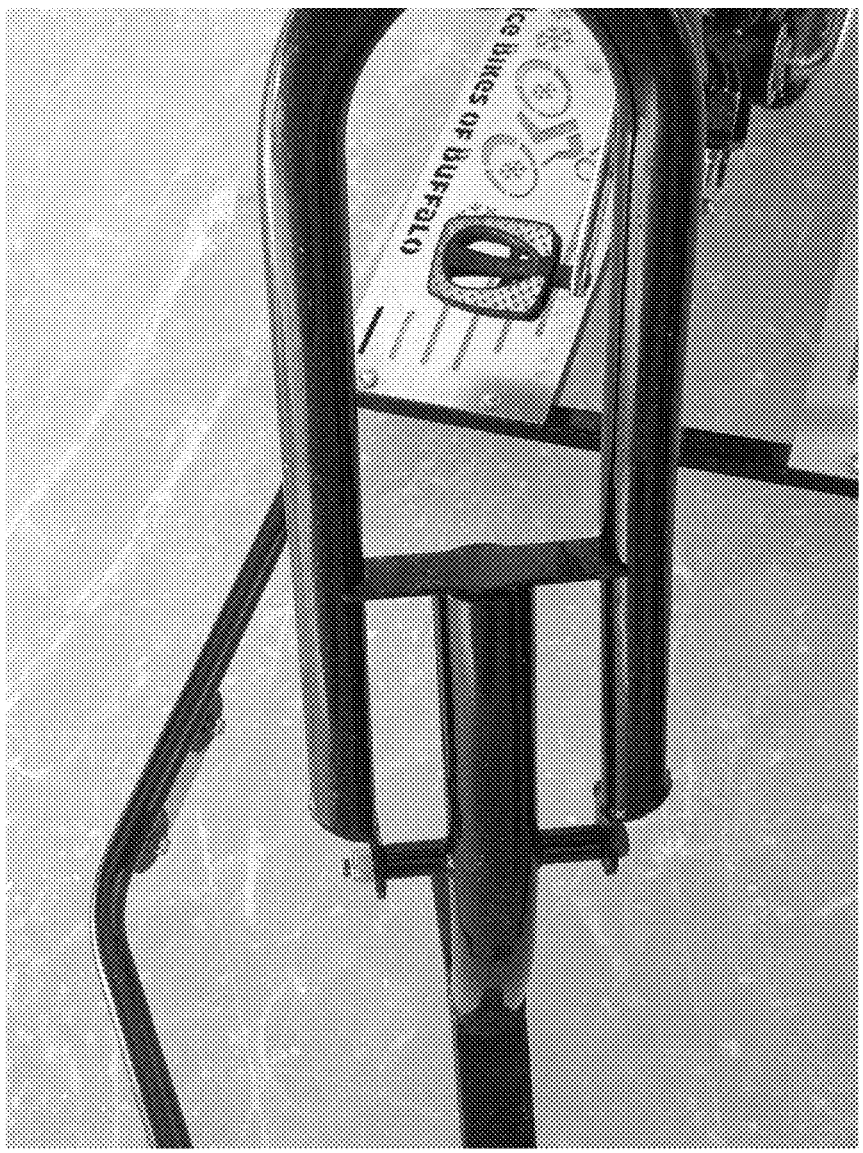
FIG. 12 is another perspective view of a vehicle according to an embodiment of the present invention, detailing the interaction of the steering apparatus and the vehicle frame.
Figure 13:
FIG. 13 is a perspective view of a vehicle according to an embodiment of the present invention, detailing the interaction of the traction apparatus and the weight compensation system.
Figure 14:
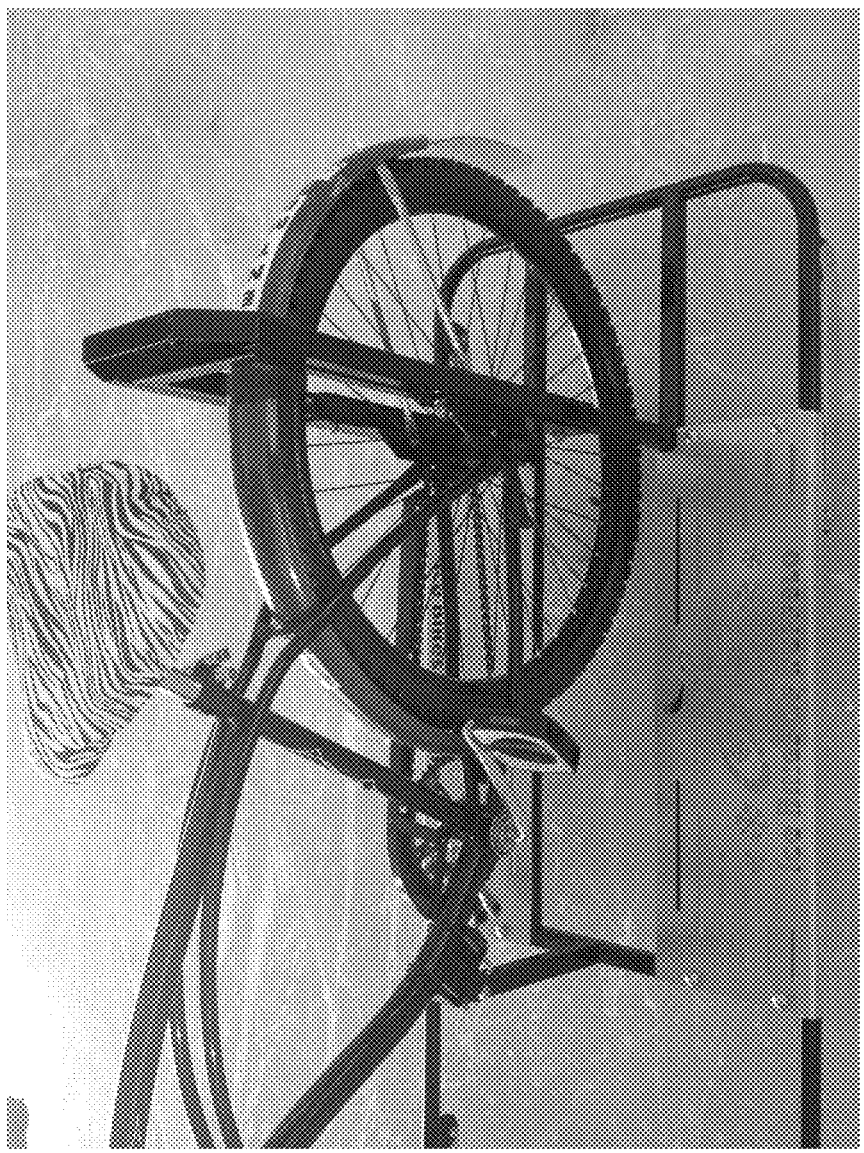
FIG. 14 is a perspective view of a vehicle according to an embodiment of the present invention.
Figure 15:
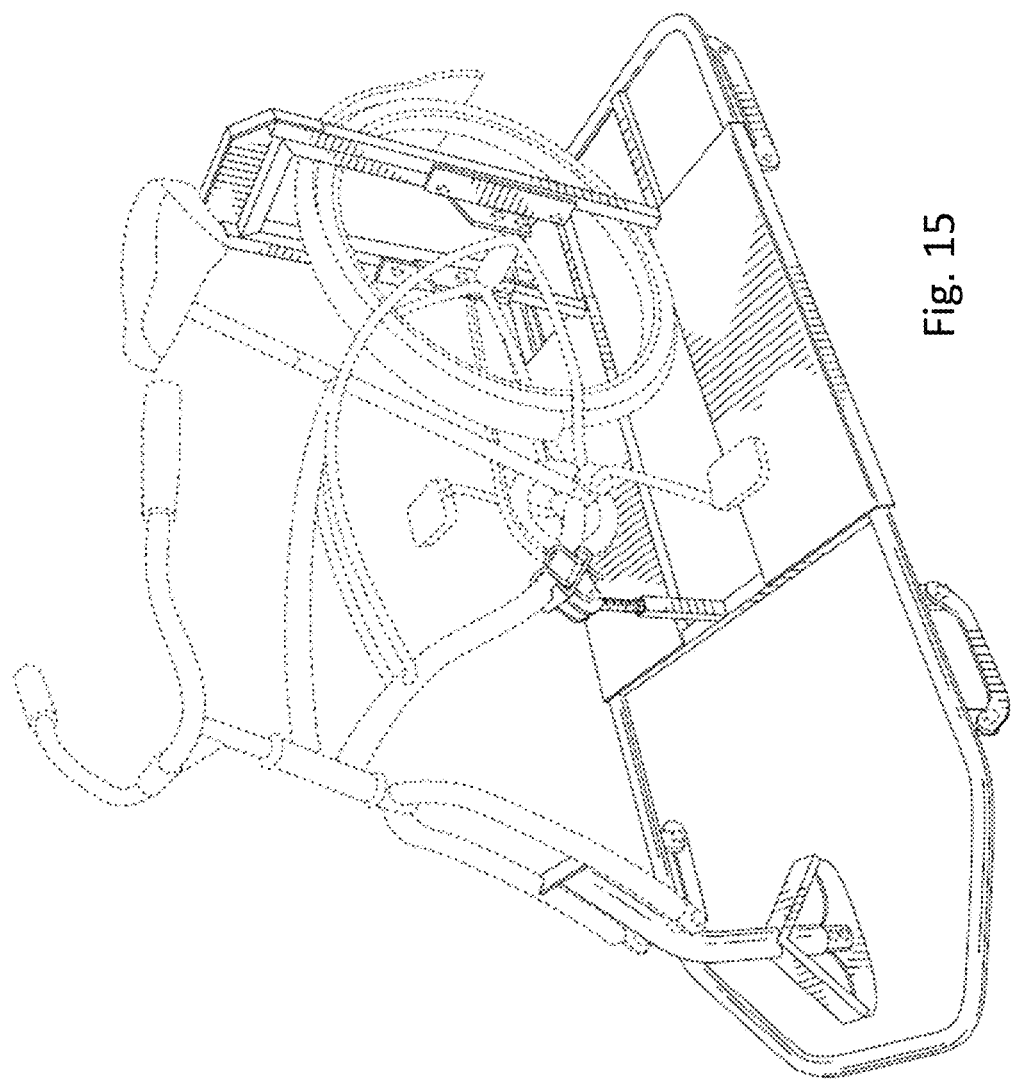
FIG. 15 a perspective view of a vehicle according to an embodiment of the present invention.

As shown in the detail views of FIGS. 6-8, the pivot 34 can be located adjacent the connection point between the support structure 20 and the vehicle frame 10. The connection point can be removably attachable to the vehicle frame 10 to allow for the system described herein to accept various vehicle frames 10. FIGS. 15-21 depict an alternative embodiment, which To further facilitate the acceptance of various size and shaped vehicle frames 10, the support structure 20 may include a vertical support 28 (FIG. 6) that is adjustable in height. For example, the vertical support 28 can include a sliding portion to adjust the overall length of the vertical support 28. A bolt, pin, or the like can be used to make the adjustments to the overall length of the vertical support 28.

Alternative embodiments of the weight compensation system are possible. For example, the weight compensation system can include a rear tread that is independently movable relative to portions of the vehicle frame. This can be achieved, for example, via a traction apparatus that translates relative to portions of the vehicle frame and/or support structure to compensate for a user's weight.

Figure 16:
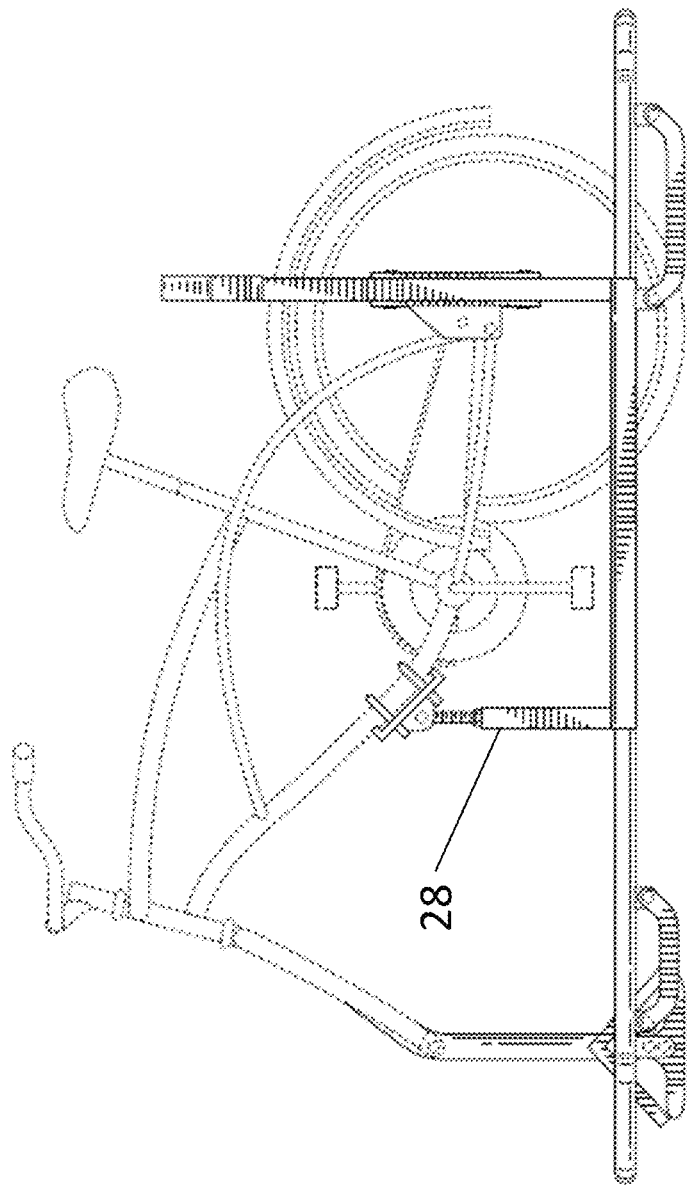
FIG. 16 is a right side view of a vehicle according to an embodiment of the present invention.
Figure 17:
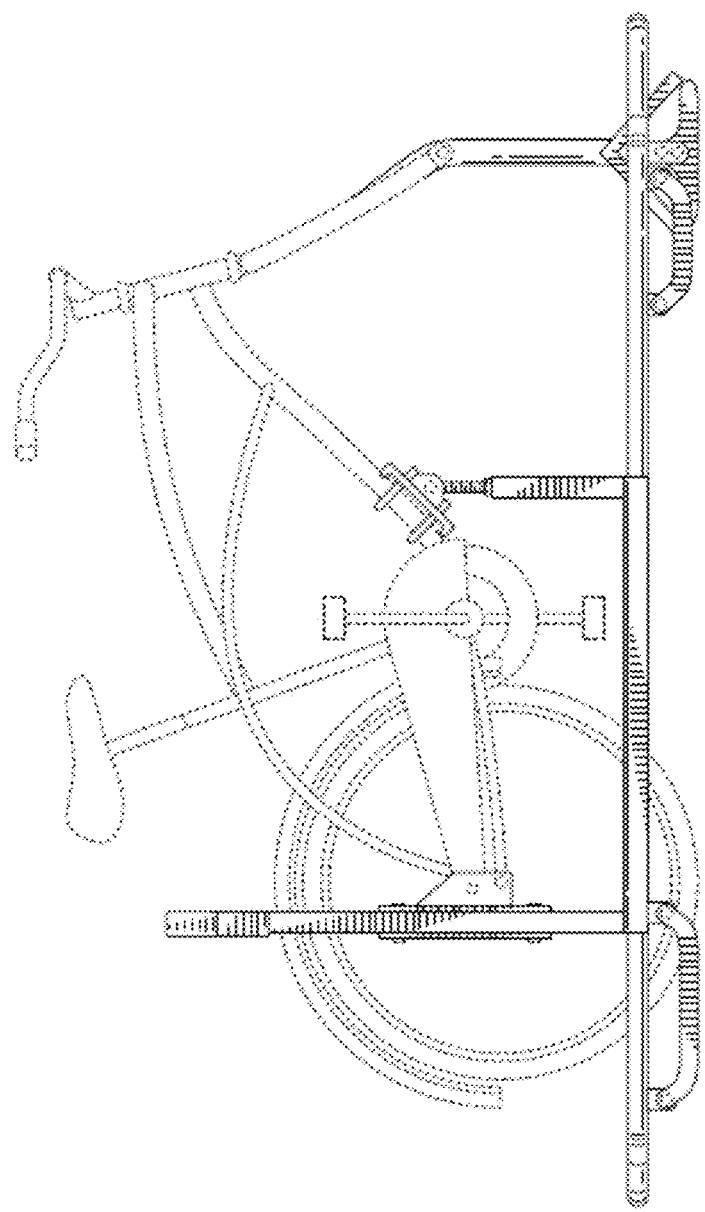
FIG. 17 is a left side view of a vehicle according to an embodiment of the present invention.

FIGS. 15-21 refer to an exemplary system generally described herein. Referring to FIG. 16, vertical member 28 is depicted to include a sliding portion to adjust the overall length. The length of vertical member 28 may be adjusted to receive various sizes of vehicle frames 10.

Figure 18:
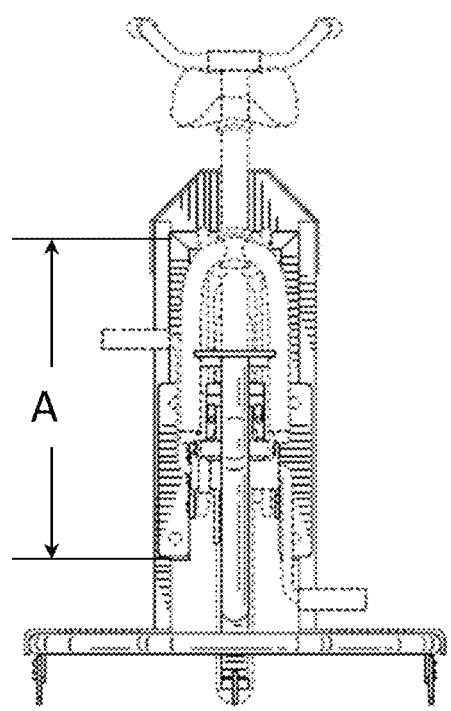
FIG. 18 is a front view of a vehicle according to an embodiment of the present invention.
Figure 19:
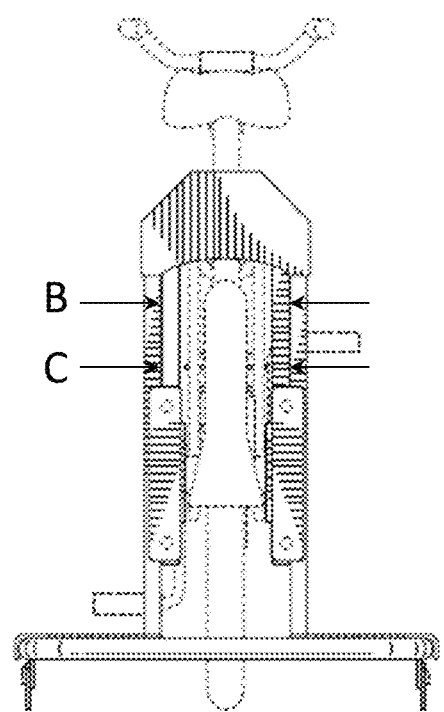
FIG. 19 is a rear view of a vehicle according to an embodiment of the present invention.
Figure 20:
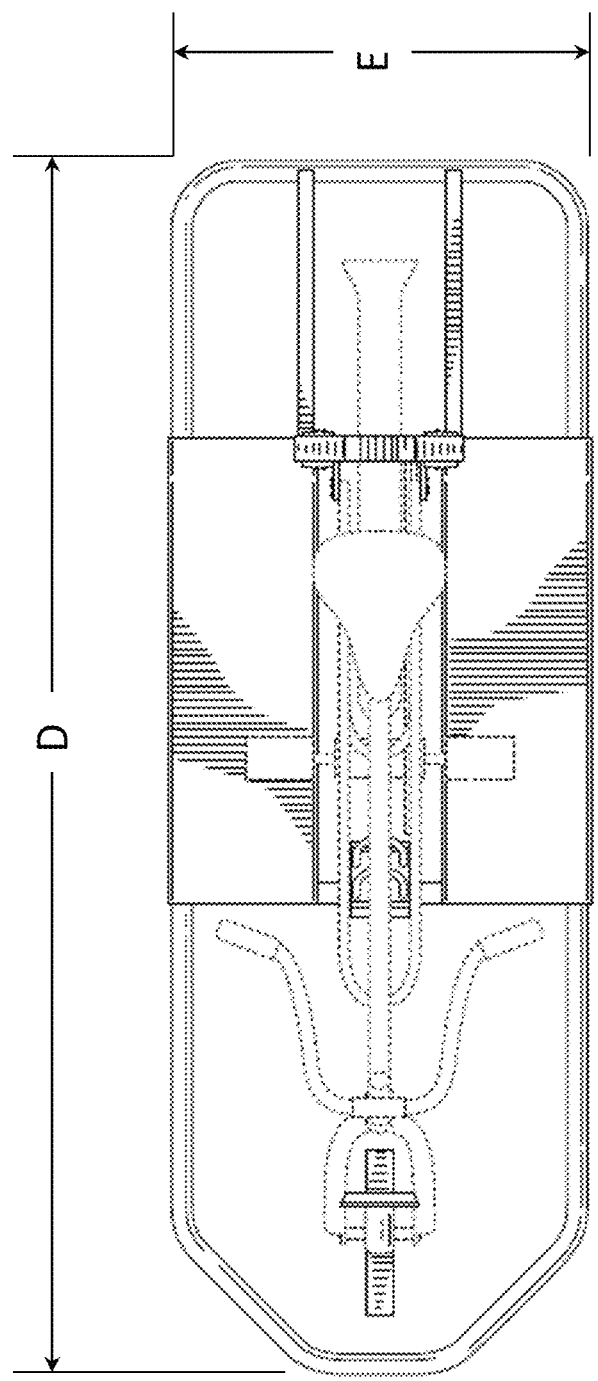
FIG. 20 is a top view of a vehicle according to an embodiment of the present invention.
Figure 21:
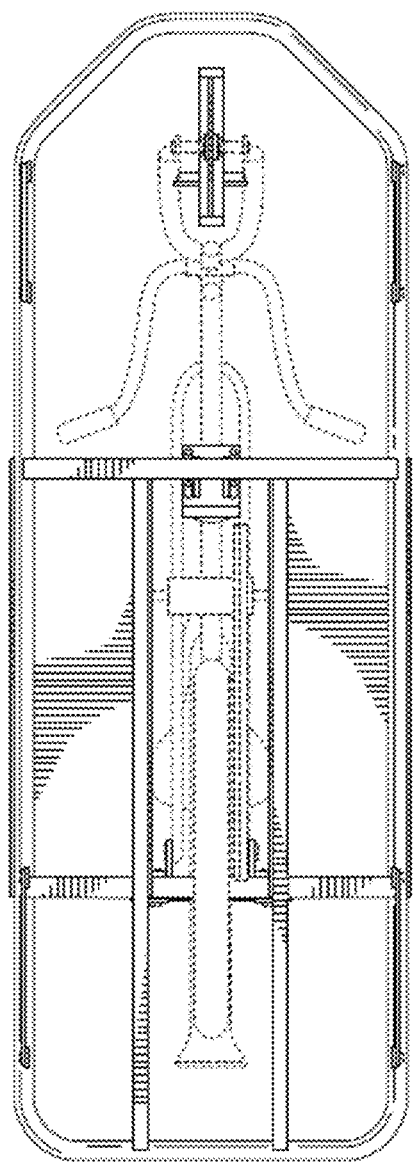
FIG. 21 is a bottom view of a vehicle according to an embodiment of the present invention.

Referring to FIG. 18, inner frame 32b has a height A. In a specific embodiment, the height A is 19.25 inches. Referring to FIG. 19, the outer frame 32a has an interior width B. In a specific embodiment, the interior width B is 7.75 inches. The inner frame 32b has an exterior width C. In a specific embodiment, the exterior width C is 7.625 inches. The clearance between outer frame 32a and inner frame 32b allows inner frame 32b to slide relative to outer frame 32a. Referring to FIG. 20, the perimeter frame 24 has an overall length D and an overall width E. In a specific embodiment, the overall length D is 64.5 inches and the overall width E is 24 inches.

The present invention provides a vehicle for travel upon snow or ice that is easy to use. Since the vehicle frame and operation resemble that of a standard bicycle, an individual may not need extensive practice to effectively use. The vehicle of the present invention is further safe for individuals for all ages to use. Since the vehicle has a steady support structure, the risk of the individual falling and injuring themselves is reduced. The vehicle of the present invention further provides a similar travelling experience for individuals of various weights. Since the weight compensation system adjusts the position of the traction apparatus diverts the applied load from the support structure, it allows users of varying weights to gain consistent traction on a surface having a low coefficient of friction.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A vehicle system comprising:
   a vehicle having a vehicle frame, a traction apparatus connected to the vehicle frame for providing traction on a planar surface, and a steering apparatus rotatably connected to the vehicle frame, the steering apparatus configured to steer the vehicle during relative movement along the planar surface, to move the vehicle relative to the planar surface, the vehicle frame having a seat for supporting a user;
   a support structure including a plurality of runners for contacting the planar surface, the plurality of runners including one or more of the following: skates and skis;
   a weight compensation system connecting the vehicle frame to the support structure about a pivot, the pivot being located between the steering apparatus and the traction apparatus;
   wherein the weight compensation system is configured to adjust the position of the traction apparatus relative to the support structure in response to weight of a user.

2. The vehicle system of claim 1, wherein the vehicle is a bicycle and the traction apparatus includes one of the following: a tire and a tread.

3. The vehicle system of claim 1, wherein the support structure includes a perimeter frame surrounding the vehicle.

4. The vehicle system of claim 3, wherein the plurality of runners are arranged around the periphery of the perimeter frame.

5. The vehicle system of claim 1, wherein the support structure further comprises a step for assisting the user in mounting the vehicle.

6. The vehicle system of claim 5, wherein the step further comprises a plurality of apertures to prevent build-up of snow or ice.

7. The vehicle system of claim 1, wherein the steering apparatus further comprises a runner configured to contact the planar surface.

8. The vehicle system of claim 1, wherein the vehicle frame rotates relative to the support structure about the pivot to adjust the position of the traction apparatus relative to the support structure in response to the relative weight of the user.

9. The vehicle system of claim 1, wherein the weight compensation system includes a slideable frame having an inner frame and an outer frame, the inner frame being translatable relative to the outer frame, the inner frame being attached to the traction apparatus and the outer frame being fixed relative to the support structure.

10. The vehicle system of claim 9, wherein the inner frame and the outer frame move between a rest position and a maximum position, wherein the rest position corresponds to no user weight being placed on the vehicle, and the maximum position corresponds to a maximum displacement between the inner frame and the outer frame from the rest position caused by the weight of the user on the vehicle.

11. The vehicle system of claim 10, wherein the weight compensation system includes a spring bias configured to bias the traction apparatus away from the maximum position.

12. The vehicle system of claim 10, wherein the inner frame and/or the outer frame include stops to prevent displacement between the inner frame and the outer frame beyond the rest position and the maximum position.

13. The vehicle system of claim 1, wherein the pivot is connected to a vertical member extending from the support structure.

14. The vehicle system of claim 13, wherein the pivot is adjustable in height relative to the support structure.

15. The vehicle system of claim 13, where the step further comprises a plurality of apertures to prevent build-up of snow or ice.

16. A method of compensating for weight on a vehicle system, comprising:
   providing:
      a vehicle frame for supporting a user and a traction apparatus connected to the vehicle frame for providing traction on a planar surface to move the vehicle relative to the planar surface, and a steering apparatus rotatably connected to the vehicle frame, the steering apparatus configured to steer the vehicle during relative movement along the planar surface;
      a support structure including a plurality of runners in contact with the planar surface, the plurality of runners including one or more of the following: skates and skis;
      wherein the support structure includes a perimeter frame surrounding the vehicle; and
      a weight compensation system connecting the vehicle frame to the support structure about a pivot, the pivot being located between the steering apparatus and the traction apparatus;
   moving the traction apparatus relative to the support structure in response to the weight of the user such that the vehicle frame rotates about the pivot.

17. The method of compensating for a weight of claim 16, wherein moving the traction apparatus relative to the support structure includes rotating the traction apparatus about the pivot of the weight compensation system.

18. The method of compensating for a weight of claim 17, wherein the weight compensation system includes a slideable frame having an inner frame and an outer frame, the inner frame being translatable relative to the outer frame, the inner frame being attached to the traction apparatus and the outer frame being fixed relative to the support structure.

19. A vehicle system comprising:

a bicycle having a bicycle frame and a wheel connected to the bicycle frame for providing traction on an ice surface to move the bicycle relative to the ice surface, and a steering apparatus rotatably connected to the vehicle frame, the steering apparatus configured to steer the vehicle during relative movement along the planar surface, the bicycle frame having a seat for supporting a user;

a support structure including a plurality of skates for contacting the ice surface;

a weight compensation system connecting the bicycle frame to the support structure about a pivot, the pivot being located between the steering apparatus and the traction apparatus;

wherein the weight compensation system is configured to adjust the position of the traction apparatus relative to the support structure in response to weight of a user;

wherein the vehicle frame rotates relative to the support structure about the pivot to adjust the position of the traction apparatus relative to the support structure in response to the relative weight of the user;

wherein the weight compensation system includes a slideable frame having an inner frame and an outer frame, the inner frame being translatable relative to the outer frame, the inner frame being attached to the wheel and the outer frame being fixed relative to the support structure.

\* \* \* \* \*

UNITED STATES PATENT AND TRADEMARK OFFICE
CERTIFICATE OF CORRECTION

| | |
|---|---|
| PATENT NO. | : 9,751,584 B2 |
| APPLICATION NO. | : 14/996898 |
| DATED | : September 5, 2017 |
| INVENTOR(S) | : Florczak et al. |

It is certified that error appears in the above-identified patent and that said Letters Patent is hereby corrected as shown below:

On the Title Page

After Related U.S. Application Data, Item (60) should read:
--(60) Provisional application No. 62/105,121, filed on Jan. 19, 2015.--

Signed and Sealed this
First Day of May, 2018

Andrei Iancu
*Director of the United States Patent and Trademark Office*